United States Patent [19]

Canitrot et al.

[11] Patent Number: 4,967,137
[45] Date of Patent: Oct. 30, 1990

[54] HIGH VOLTAGE ELECTRICAL POWER SUPPLY DEVICE FOR THE AUXILIARY CIRCUIT OF A MOTOR VEHICLE

[75] Inventors: Didier Canitrot, La Queue en Brie; Christian Ducrot, Creteil; Jean-Francois Terasse, Athis Mons, all of France

[73] Assignee: Equiepments Electroques Moteur, Creteil, France

[21] Appl. No.: 340,030

[22] Filed: Apr. 18, 1989

[30] Foreign Application Priority Data

Apr. 19, 1988 [FR] France ................ 88 05163

[51] Int. Cl.⁵ .................. B60L 1/02; H02P 9/00; H02J 7/14
[52] U.S. Cl. ...................... 322/7; 219/203; 307/16; 322/90
[58] Field of Search .......... 322/7, 8, 90; 219/202, 219/203; 307/16

[56] References Cited

U.S. PATENT DOCUMENTS

| | | | |
|---|---|---|---|
| 3,469,073 | 9/1969 | Zechin | 219/279 |
| 3,585,358 | 6/1971 | Nilssen | 219/202 X |
| 3,668,419 | 6/1972 | Cherry et al. | 219/202 X |
| 4,009,431 | 2/1977 | Johnson | 322/7 |
| 4,117,390 | 9/1978 | Iwata et al. | 219/202 X |
| 4,456,870 | 6/1984 | Rodari | 322/90 X |
| 4,730,097 | 3/1988 | Campbell et al. | 219/203 |

FOREIGN PATENT DOCUMENTS

| | | |
|---|---|---|
| 0246976 | 11/1987 | European Pat. Off. |
| 0286510 | 10/1988 | European Pat. Off. |
| 1483033 | 8/1977 | United Kingdom |
| 8403595 | 9/1984 | World Int. Prop. O. |

Primary Examiner—R. J. Hickey

[57] ABSTRACT

The invention relates to a high voltage electrical power supply device for an auxiliary circuit CA of a motor vehicle.

The device comprises an alternator 1 having two identical stator windings 11 and 12, each connected to a rectifier bridge 13 and 14 supplying a rectified alternator voltage on a terminal B+1, B+2 an excitiation regulator 2 enabling the regulation of the excitation current of the inductor winding of the alternator and means for parallel-series/series-parallel switching of the stator windings. Alternator output terminals B+1, B+2 are provided for generating a nominal value voltage or a high voltage. A control logic is interconnected with the excitation regulator 2 and the switching means 3 to ensure the starting of the high voltage operation conditionally with respect to status parameters of the vehicle such as the engine speed, the clutch position, the temperature of the vehicle, and the supply voltage of the device.

Applications to the electrical power supply of the auxiliary circuits of utility or personal motor vehicles and in particular to windshield de-icing.

8 Claims, 3 Drawing Sheets

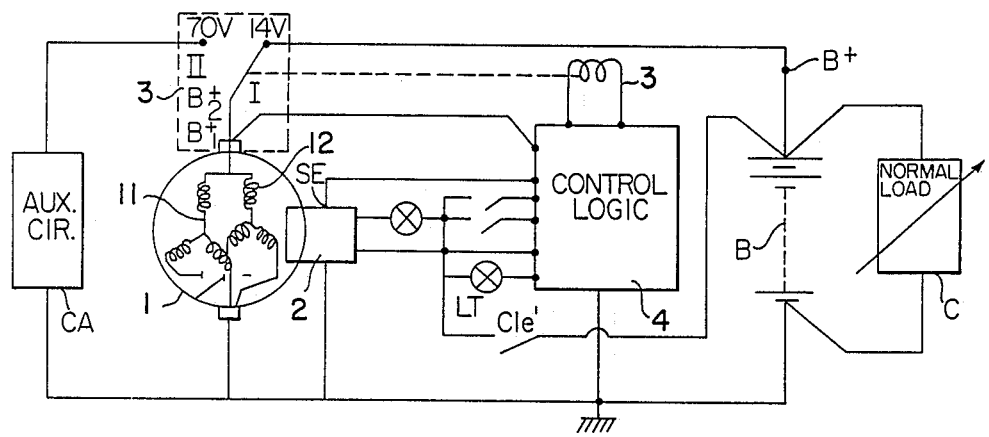
FIG_1a
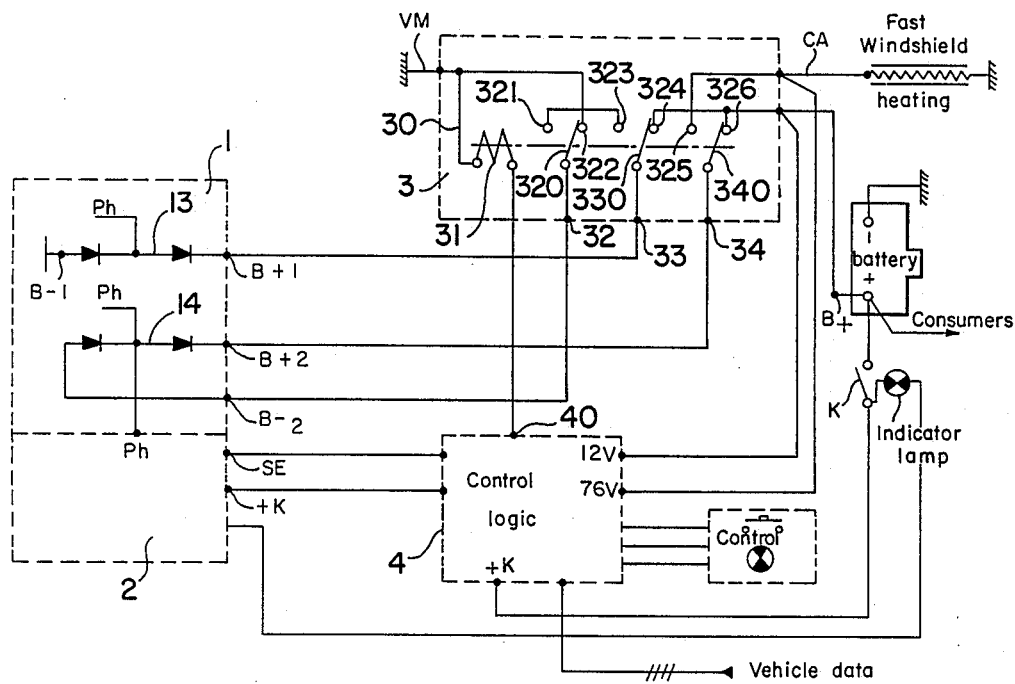
FIG_1b

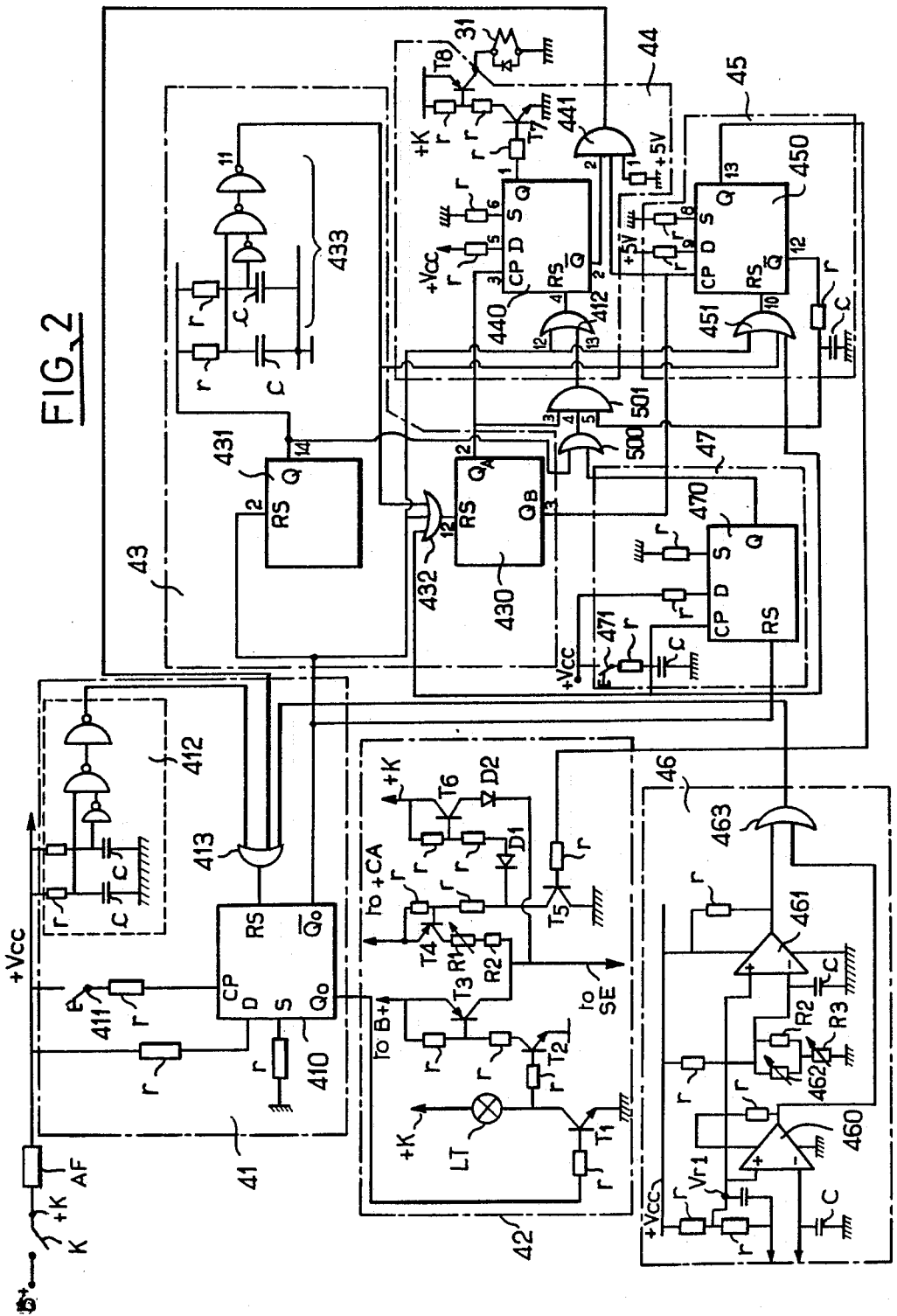
FIG_2

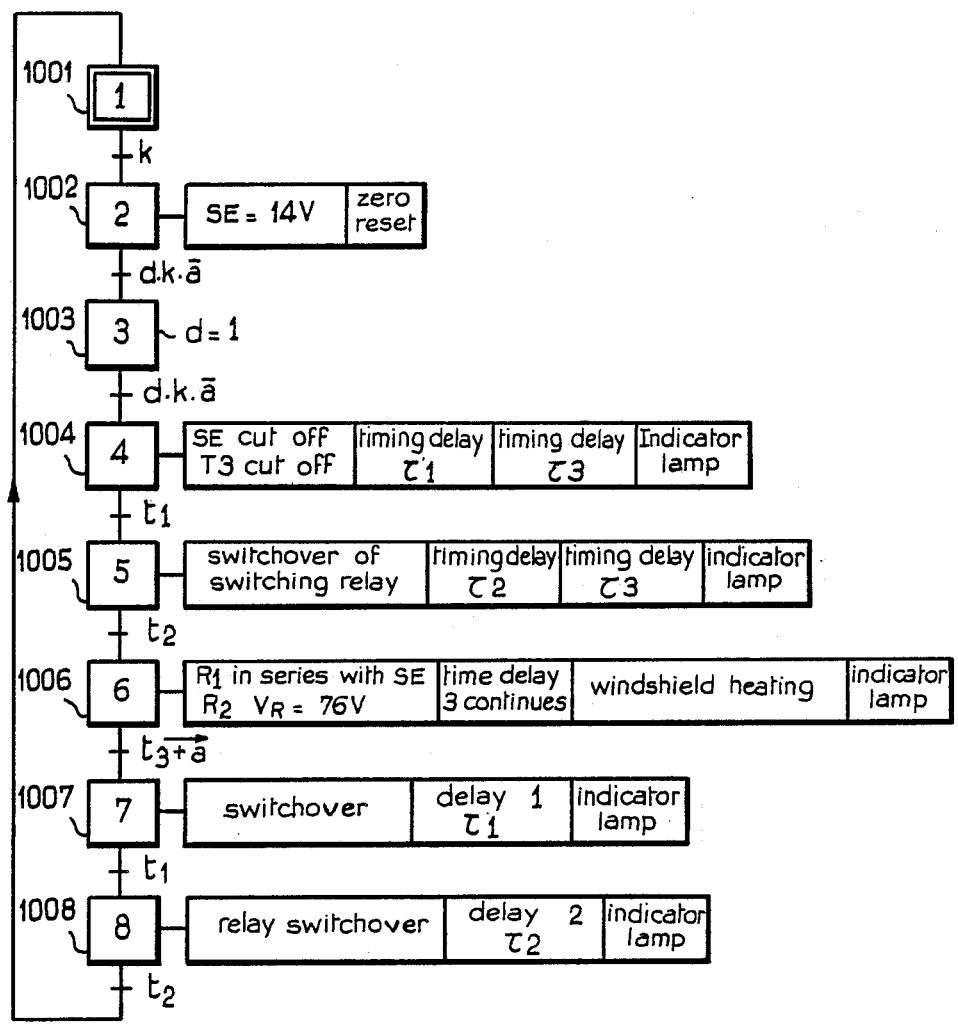
FIG_3

HIGH VOLTAGE ELECTRICAL POWER SUPPLY DEVICE FOR THE AUXILIARY CIRCUIT OF A MOTOR VEHICLE

The present invention relates to a high voltage electrical power supply device for the auxiliary circuit of a motor vehicle.

Present motor vehicles, whether they are heavy vehicles or personal vehicles, tend to consume more and more electrical energy, particularly for the purpose of improving the comfort of use of the latter in unfavorable climatic conditions for example.

In order to ensure a corresponding recharging of the accumulator batteries fitted to these vehicles, it has recently been proposed to equip the electrical systems of these vehicles with polyphase alternators comprising two identical stator windings. These stator windings are connected in parallel or in series in order, depending on the speed of rotation of the rotor of the alternator, to significantly increase the electrical power supplied by the two-winding alternator to the battery. Such two-winding alternators are currently available commercially and will not therefore be described in detail.

Although the increase in electrical power thus obtained enables the provision of better recharging conditions of the battery at the nominal voltage of the latter, approximately 14 V, the use of this type of alternator responds poorly to the creation, on board these vehicles, of new functions such as, for example, the fast heating of an element essential to the driving of the vehicle, such as the windshield or the rear window, for the purpose of de-icing or demisting the latter. Such functions involve the use of a very large amount of electrical power, approximately or greater than 1000 W, for a duration of several minutes.

An object of the present invention is to overcome the abovementioned disadvantages by the implementation of a high voltage electrical power supply device for the auxiliary circuit of a motor vehicle, the high voltage conditions having a temporary nature.

Another object of the present invention is the implementation of a high voltage power supply device enabling the power supply to be generated in high voltage conditions conditionally with respect to status parameters of the vehicle such as, in particular, the idling of the engine, zero velocity of the vehicle, temperature outside or inside the vehicle.

The high voltage electrical power supply device for an auxiliary circuit of a motor vehicle according to the invention is noteworthy in that it comprises an alternator having two identical stator windings. Each stator winding is connected to a rectifier bridge supplying a rectified alternator voltage on a corresponding alternator output terminal. An excitation regulator enables the regulation of the excitation current of the inductor winding of the alternator. Means for parallel-series/series-parallel switching of the alternator output terminals are provided to generate a nominal value supply voltage, while switched in parallel, or a high voltage supply voltage while switched in series. A control logic interconnected with the excitation regulator and the switching means enables the conditional starting of the high voltage operation to be ensured by switching the terminals in series, the switching means comprising an output terminal enabling the supply of the nominal value supply voltage or of the high voltage supply voltage.

The invention is applicable to the motor industry for equipping personal or utility vehicles.

The invention will be better understood on reading the following description and on observing the drawings in which:

FIG. 1a is a general diagram of the high voltage electrical power supply device for the auxiliary circuit of a motor vehicle according to the invention, FIG. 1b shows, in particular, a non-limitative embodiment of the parallel-series/series-parallel switching means of the device according to the invention such as shown in FIG. 1a, FIG. 2 is a detailed diagram of an advantageous, non-limitative embodiment of the control logic of the device according to the invention such as shown in FIG. 1a or 1b, FIG. 3 is a flowchart of the status of the device according to the invention, in particular taking account of the embodiment of the control logic such as shown in FIG. 2.

The high voltage electrical power supply device for the auxiliary circuit of a motor vehicle will firstly be described with reference to FIGS. 1a and 1b.

FIG. 1a is a general representation of a high voltage electrical power supply device for an auxiliary circuit referenced CA of a motor vehicle according to the subject of the present invention. This device is noteworthy in that it comprises, in particular, an alternator, referenced 1, having two identical stator windings, these stator windings being referenced 11 and 12.

As shown furthermore in FIG. 1b particularly, each stator winding is connected to a rectifier bridge referenced 13 and 14 respectively supplying a rectified alternator voltage at a corresponding alternator outputs terminal referenced B+1 and B+2 respectively. The rectifier bridges 13 and 14 are of course not shown in FIG. 1a in order not to clutter the drawing.

In the abovementioned FIG. 1a there will also be noted the presence of an excitation regulator 2 enabling the regulation of the excitation current of the inductor winding of the alternator 1. A detailed representation of the alternator and of the excitation regulator has not been given as this type of alternator, as mentioned before in the description, is normally available commercially.

As will also be noted in FIGS. 1a and 1b, means 3 for parallel-series/series-parallel switching of the output terminals B+1 and B+2 are provided in order to generate a nominal value supply voltage during the abovementioned switching of B+1 and B+2 in parallel. A high voltage supply voltage is on the other hand generated while the alternator output terminals B+1 and B+2 are switched in series.

Furthermore, a control logic 4 enables the control, as a function of various parameters as will be described in greater detail hereafter in the description, of the previously mentioned parallel-series/series-parallel switching. The control logic 4 is interconnected with the excitation regulator 2 and with the switching means 3 in order to ensure the conditional starting of the high voltage operation by the switching of the corresponding alternator output terminals B+1 and B+2 in series. As shown diagrammatically in FIG. 1a, the switching means 3 in fact comprise an output terminal enabling the supply of the nominal value supply voltage when the switching means are in the position referenced I as shown in FIG. 1a, this nominal voltage for example being equal to 14 volts in order to ensure the recharging of the battery B by interconnection via a battery terminal referenced B+. On the other hand, when the switching means are in the switching position referenced II, the alternator 1, because of the series switching of the stator windings 11 and 12, enable the supply, because of its operation, of a much higher voltage, in the order of 70 volts for example, to the load referenced CA. In this same FIG. 1a it will be noted, by way of example, that the normal load of the electrical energy supply system of the vehicle is referenced C, the latter being connected between the vehicle voltage referenced VM and the terminal B+ of the battery B.

In the case of utility vehicles or personal vehicles, the auxiliary circuit CA can advantageously be constituted by a resistive fast heating element for the windshield of the vehicle for the purpose of de-icing it. In this case, the fast heating resistive element can be constituted by a sheet of resistive material inserted between the laminations of the windshield.

As shown in greater detail in FIG. 1b, the control logic 4 enables the generation at an output terminal 40 of a start signal for the fast heating conditionally with respect to values of status parameters of the motor vehicle. These motor vehicles status parameters can for example be the zero velocity of the vehicle or the neutral position of the clutch system. In the latter case, the neutral position of the clutch system of the vehicle can advantageously be detected by a detector system which is not shown in the drawings. The vehicle status parameters can of course be also be constituted by parameters of the atmospheric environment of the latter, these parameters thus being able to be constituted by the outside temperature, or even the inside temperature of the vehicle with respect to a reference value.

FIG. 1b shows in greater detail the interconnection of the control logic 4 with, on the one hand, the regulator 2 and the parallel-series/series-parallel switching means 3 of the alternator output terminals B+1 and B+2.

As can be seen in the abovementioned FIG. 1b, the switching means 3 comprise for example a power switching relay 30 whose energizing coil 31 is connected between the voltage referenced VM or the ground of the vehicle and the output terminal 40 of the control logic 4.

By way of non-limitative example, the power switching relay 30 can comprise three input terminals 32, 33, 34, three contact blades 320, 330, 340 and six switching terminals, these switching terminals being referenced 321, 322, 323, 324, 325 and 326.

In the absence of excitation of the energizing coil 31, i.e. when the alternator is operating in nominal voltage conditions, the abovementioned contact blades referenced 320, 330, and 340 respectively provide contact between the first input terminal 32 and the second switching terminal 322, the contact between the second input terminal 33 and the fourth switching terminal 324, the contact between the third input terminal 34 and the sixth switching terminal 326. Furthermore, the first switching terminal 321 and third switching terminal 323 are connected together, the fourth switching terminal 324 and sixth switching terminal 326 are connected together and the fourth switching terminal 324 and the sixth switching terminal 326 are connected to an input terminal of the switching means, this input terminal being connected to the positive terminal B+ of the vehicle. The second and fifth switching terminals 322 and 325 are respectively connected to the vehicle ground VM and to the auxiliary circuit CA constituting a fast heating circuit for the vehicle. The contact blades 320, 330 and 340 respectively provide, in the presence of excitation of the energizing coil 31, i.e. during the operation of the alternator in the high voltage condition by switching the stator winding in series, the contact between the first input terminal 32 and the first switching terminal 321, the contact between the second input terminal 33 and the second switching terminal 323, the contact between the third input terminal 34 and the fifth switching terminal 325. The first input terminal 32 is connected to the negative rectified alternator output terminal referenced B−2 of one of the stator windings. The second input terminal 33 is connected to the positive alternator output B+1 of tee other alternator stator winding and the third input terminal 34 is connected to the rectified alternator output terminal B+2 of the stator winding, the negative rectified alternator output terminal B−1 of the other stator winding being connected to the vehicle ground VM. Thus, the fifth switching terminal 325 supplies, on series switching, the voltage supplied by the alternator in high voltage conditions.

A more detailed description of the control logic 4 will now be given with reference to FIG. 2.

As shown in the abovementioned FIG. 2, the control logic 4 comprises an input circuit 41 for controlling the starting of the high voltage supply, a circuit 42 for controlling the input of the rectified alternator voltage to the regulator, a circuit 43 for counting a predetermined duration of maintaining the operation of the power supply in high voltage conditions and an output circuit 44 for controlling the parallel-series/series-parallel switching means. The control logic can of course also comprise other circuits, which will be described later in the description.

By convention, FIG. 2 shows a non-limitative embodiment of the various circuits previously referenced 41 to 45. This embodiment can be produced from electronic components which are normally available commercially and, by convention "r" has been used to represent any resistor intended to ensure the operation or biasing of these components and "c" is used to represent any capacity or capacitor of specified value intended to ensure either the connection or the decoupling of specified terminals of these components. It will of course be understood that the respective values of these resistors r or capacitors c are different even though the symbol denoting them is identical, these elements not actually performing any particular function with respect to these components other than their implementation or supply according to the specifications indicated by the retail supplier of these components.

As can be seen in FIG. 2, the terminal B+ of the battery is connected by means of the vehicle's ignition key, referenced K, to a terminal referenced +K controlled by the ignition key. To the terminal +K of the ignition key there is connected a smoothing power supply circuit referenced AF supplying at its output a DC supply voltage referenced +Vcc, which provides, for example the electrical energy power supply for the various abovementioned electronic components. The supply voltage +Vcc can for example have the value 5 or 6 volts.

As shown in FIG. 2, the input circuit 41 for controlling the starting of the high voltage supply comprises, by way of non-limitative example, a bistable flip-flop referenced 410 triggered by a staring push button referenced 411. The bistable flip-flop 410 can advantageously be constituted by an integrated circuit number 4013 marketed by the MOTOROLA Company. The input circuit 41 for controlling the starting of the high voltage supply also comprises a reset-to-zero circuit 412 of the logic assembly on closure of the ignition key K, which is constituted by three NAND gates connected in cascade, one input of the first and of the second NAND gates being connected to a resistor r and capacitor c circuit having a determined time constant.

The output of the last NAND gate constituting the reset-to-zero circuit 412 is connected to the input referenced RS of the bistable flip-flop 410 via a three-input OR gate 413. Thus the bistable flip-flop 410 is connected to the starting push-button 411 via its input referenced CP, the set input referenced S being connected via a resistor r to the ground voltage VM of the vehicle and the reset input RS being connected to the output of the abovementioned OR gate 413. On operating the starting push-button 411, the outputs QO and QO supply logic levels by changing from their high voltage level to their low voltage level and vice-versa.

As furthermore shown in FIG. 2, the input control circuit 42 of the rectified alternator voltage to the regulator comprises switching means constituted by the transistors T1, T2 and T3 enabling, when the high voltage power supply is started by means of the starting push-button 411 and of the signal supplied by the flip-flop 410 on its output QO, the cutting-off of the rectified alternator voltage supplied to the regulator when the transistor T3 is cut off. In the absence of operation of starting push-button 411 and corresponding signal on the output QO of the flip-flop 410, the transistor T3 is normally conducting and supplies to the rectified alternator voltage input of the regulator, i.e. to the input referenced SE of the regulator, the battery voltage supplied by the terminal B+ of the latter. It will be noted that the transistors T1, T2, and T3 are connected in cascade, the transistor T3 thus constituting the output stage enabling the application of the nominal battery voltage supplied by the terminal B+ to the input SE of the regulator.

Furthermore, the control circuit for the input of the rectified alternator voltage 42 to the regulator comprises switching means constituted by the transistors T4, T5 and T6. The collector terminal of the transistor T1 is connected to the terminal +K of the ignition key, i.e. to the terminal B+ of the battery when the ignition key K is operated, this connection being made via an indicator lamp LT. The transistor T2 is in common emitter configuration and the transistor T3 is constituted by complementary type of transistor, i.e. in the embodiment shown in FIG. 2 by a PNP transistor whose emitter is directly connected to the abovementioned terminal B+, the collector being connected to the input terminal SE of the regulator. Similarly, the transistors, T5 and T4 are connected in cascade, the transistor T4 being constituted by a PNP transistor whose emitter is connected to the connecting terminal of the auxiliary load CA, the collector of this same transistor T4 being connected to the input terminal SE of the regulator via a variable resistor R1 and a ballast resistor R2. The base of the transistor T4 is connected to the collector of the transistor T5, which, constituted by a NPN transistor, has its collector connected to the ground voltage VM of the device. The base of the transistor T6 is connected to the collector of the transistor T5 via a first forward biased diode D1 and the collector of the transistor T6 is connected to the input terminal SE of the regulator via a forward biased diode D2. The transistors T4, T5 and T6 enable, when the transistors T5 and the T4 are put into saturation, the supply of a reduced rectified alternator voltage, the voltage on the supply terminal of the auxiliary load +CA reaching the value of the voltage in high voltage conditions, namely 70 volts, via voltage dropping resistors R1, R2, the value of the rectified alternator voltage a the point SC substantially corresponding to that of the rectified alternator voltage in normal conditions.

Furthermore the input control circuit 45 of the rectified alternator voltage to the regulator comprises a bistable flip-flop 450 formed by an integrated circuit marketed by the MOTOROLA Company with the reference number 4013. The bistable flip-flop 450 is triggered after a delay following the operating of the starting push-button 411 as will be described later in the description, the control output Q of the flip-flop 450 enabling the control of the switching of the transistor T5 of the input control circuit 42 of the rectified alternator voltage to the regulator. The input control circuit 45 of the rectified alternator voltage to the regulator comprises, in addition to the bistable flip-flop 450, a three-input OR gate 451 whose output is connected to the reset terminal RS of the flip-flop 450 the set terminal S being connected to the ground voltage via a resistor.

In order to ensure the control of the starting of the fast heating, under good conditions, the circuit 43 for counting a predetermined duration and for maintaining the high voltage power supply operation comprises, as shown in FIG. 2, a first timing circuit 430 enabling, after a first time period referenced τ1 of determined duration, the triggering of the switching means by excitation of the energizing coil. The first timing circuit enables, following a second time period τ2, the putting into saturation of the transistors T4, T5 and T6 of the input control circuit 42 of the rectified alternator voltage to the regulator.

By way of non-limitative example, as shown in FIG. 2, the first timing circuit 430 is constituted by an integrated circuit marketed by the MOTOROLA Company with the reference No. 4060. This integrated circuit is constituted by a group of flip-flops whose common reset input RS is connected to the output of a three-input OR gate 431, the output QB of the flip-flop thus constituted and forming the first timing circuit 430 being connected to the input CP of the bistable flip-flop 450 constituting the input control circuit 45 of the rectified alternator voltage to the regulator.

Furthermore, a second timing circuit 431 is provided for constituting the circuit 43 for counting a predetermined duration of maintaining the high voltage power supply operation. This second timing circuit 431 enabling the definition of the duration of maintaining the high voltage power supply over a supply period τ3. It enables, at the end of this duration τ3, the resetting to zero of the first timing circuit 430 via the assembly 433 and the stopping of the high voltage power supply according to a cycle which uses the first time periods τ1, τ2, again in order to obtain the switching of the relay 30 in the absence of current in the contacts. The second timing circuit 431 can be constituted by an integrated circuit marketed by the MOTOROLA Company with the reference No. 4521. The reset input RS of the abovementioned integrated circuit is connected to the output $\overline{QO}$ of the bistable flip-flop 410 of the input control circuit 41 for the starting of the high voltage power supply. The output Q of the integrated circuit constituting the second timing circuit 431 is connected to the RS input of the first timing circuit 430 by means, on the one hand, of a three-input OR gate 432 and a signal shaping circuit 433 constituted by three NAND gates connected in cascade, the first two NAND gates having their inputs connected to a resistor-capacitor circuit of the integrating type, these resistor-capacitor circuits themselves being connected to the Q output of the second timing circuit 431.

As also shown in FIG. 2, the output circuit 44 controlling the parallel-series/series-parallel switching means comprises a bistable flip-flop 440 which receives a control signal from the first timing circuit 430. This control signal is constituted by the signal supplied by the output QA of the first timing circuit 430, this output being connected to the input CP of the bistable circuit 440. The bistable circuit 440 can advantageously be constituted by an integrated circuit marketed by the MOTOROLA Company with the reference No. 4013. The set input S of this bistable circuit is connected to the ground voltage via a resistor r and the reset input RS is connected to the output $\overline{QO}$ of the bistable flip-flop 410 via a two-input OR gate 442. The output terminal Q is connected to a second input of the three-input OR gate 413 of the control input circuit 41 for the starting of high voltage supply by means of a three-input AND gate 441. The output terminal Q of the bistable flip-flop 440 is connected to a power circuit constituted by two transistors T7 and T8. The transistor T8 is for example a PNP transistor whose collector electrode is directly connected to the terminal K+ of the ignition key K of the vehicle and whose collector is directly loaded by the energizing coil 31 or excitation winding of the relay of the parallel-series/series-parallel switching means. The transistor T7 is constituted by an NPN transistor whose emitter is connected to the ground voltage VM of the vehicle and whose collector is connected via bias resistors r to the terminal +K of the vehicle's ignition key, the base of the transistor T8 being connected to an intermediate point of the abovementioned bridge of resistors r. The base of the transistor T7 is connected to the output Q of the bistable circuit 440.

Furthermore, as shown in FIG. 2, the control logic 4 also comprises an input circuit 47 for controlling the stoppage of the high voltage power supply. As shown in the abovementioned figure, this circuit advantageously comprises a bistable flip-flop referenced 470 constituted by an integrated circuit marketed by the MOTOROLA Company with the reference No. 4013. The reset input RS of this bistable circuit 470 is connected to the output QO of the bistable flip-flop 410 of the input circuit 41 controlling the starting of the high voltage power supply. The set input S of the bistable flip-flop 470 is connected to the ground voltage of the device via a bias resistor r and the input CP of bistable flip-flop 470 is connected to a stop push-button referenced 471 by means of a bias resistor r and a decoupling capacitor referenced c. The connection between the circuit 43 counting a predetermined duration, the output circuit 44 controlling the parallel-series/series-parallel switching means, the input control circuit 45 of the rectified alternator voltage to the regulator and the circuit 47 controlling the stoppage of the high voltage supply is embodied by means of an OR gate 500 and an AND gate 501. The OR gate 500 receives on a first input the output Q of the bistable flip-flop 470 and on a second input the output Q of the bistable flip-flop 431 constituting the second timing means. The output of the OR gate 500 is connected to one of the inputs of the three-input AND gate 501. Another input of the AND gate 501 is connected to the output terminal QA of the flip-flop 430 constituting first timing means. The last input of the AND gate 501 is itself connected to the output $\overline{Q}$ of the monostable flip-flop 450 of the input control circuit 45 of the rectified alternator voltage to the regulator by means of a resistor-capacitor circuit of the integrating type referenced rc. The output of the AND gate 501 is connected to an input of the OR gate 442 whose output is itself connected to the input of the reset input RS of the bistable flip-flop 440 of the output circuit 44 controlling the parallel-series/series-parallel switching means.

As seen in FIG. 2, the control logic 4 furthermore comprises a circuit 46 for detecting temperature and engine speed conditions. This circuit advantageously comprises a first comparator 460 receiving on a positive terminal a reference voltage Vr1 and on its negative terminal a voltage representative of the minimum operating voltage. The output of the first comparator 460 is connected to an OR gate 463 whose output is itself connected to the third OR gate 413 of the input circuit 41 controlling and starting the high voltage power supply. The temperature detection circuit 46 furthermore comprises a second comparator 461 receiving on a positive terminal the reference voltage Vr1 and on its negative terminal a voltage representative of the ambient temperature or of the temperature inside the vehicle from a resistive bridge comprising a resistor having a temperature coefficient 462 and calibrating resistors R2 and R3. The output of the comparator 461 forming a second comparator is connected to another input of the OR gate 463.

The functioning of the control logic such as shown in FIG. 2 will be described with reference to FIG. 3.

In FIG. 3 the letters a, d, and k denote the following functional variables: a denotes the stoppage of de-icing or fast heating, d denotes the de-icing or fast heating request, k denotes the operation of the vehicle's ignition key, the barred letters or variables of course representing the absence of these states.

The position 1001 represents the initial position in which the vehicle is stopped in the absence of any fast heating request. Following the closing of the ignition key K, the position 1002 represents the next stage according to which the vehicle is stopped but the engine of the vehicle has been started. In this position, as the transistor T3 is now conducting by means of the transistor T1 and T2, the terminal SE of the regulator receives the voltage supplied by the terminal B+ of the battery. The reset-to-zero circuit 412 generates a pulse which is transmitted to the OR gate 413 and causes the resetting to zero of the flip-flop 410, the transistor T3 still of course being held in the conducting state. When there is a request for fast heating or de-icing, the position 1003 is reached, the variable d being equal to 1, by operating the starting push-button 411. Following the abovementioned position, the position 1004 is reached in which on the switchover of the bistable flip-flop 410 and via the transistor T1 and the transistor T2, the transistor T3 is cut off, which has the effect of cutting off the voltage on the input SE of the regulator. The indicator lamp LT controlled by the transistor T1 lights to indicate the starting of the fast heating circuit. The two timing circuits 430 and 431 begin to respectively count the first timing period τ1 equal for example to 400 milliseconds and the third timing period τ3 equal for example to 5 minutes, the duration of the fast heating.

At the end of the first timing period of duration τ1, the position 1005 is reached, the output Q of the first timing circuit 430 causing by means of flip-flop 440 the supply of the energizing coil 31 and therefore the engagement of the parallel-series/series-parallel switching relay. The first timing circuit 430 enables, following a second timing period τ2 equal for example to 400 milliseconds, the driving into saturation of the transistors T4, T5 and T6 of the control circuit of the rectified alternator voltage to the regulator, this position being reached at 1006 where the resistors R1, R2 are then connected in series with the input terminal SE of the regulator, the voltage supplied by the alternator then being equal to 70 volts. Of course, during the positions 1005 and 1006, the timing period τ3 enabling the definition of the duration of maintenance of the high voltage power supply is counted by the second timing circuit 431. It will be understood that the connection of the resistors R1 and R2 in series with the input terminal SE of the regulator has the effect of enabling the corresponding operation of the alternator in the high voltage condition, the voltage applied to the input terminal SE of the regulator being approximately equal to the nominal voltage of 14 volts because of the voltage drop in the resistors R1 and R2. However, the voltage supplied by the alternator is equal to 70 volts and the auxiliary load CA of the vehicle is thus submitted to the so-called fast heating conditions. At the end of the time period τ3, the second timing circuit 431 supplies its switchover information, which is converted into pulses by the circuit 433, which has the effect of resetting to zero the first timing circuit 430 as well as the input control circuit 45 of the rectified alternator voltage to the regulator by means of the flip-flop 450. This position is reached in FIG. 3 at 1007 and the switchover of the abovementioned bistable flip-flop 450 has the effect of causing, by means of the transistor T5 and the transistor T4, the cutting-off of the circuit connected to the input terminal SE of the regulator. The timing circuit 430, previously reset to zero by the second timing circuit 431 at the end of the time period τ3 equal to 500 minutes, delivers on its output terminal QB a switchover voltage, which, by means of the OR gate 441 and the OR gate 413, has the effect of performing a zero reset of the bistable circuit 410. The direct connection of the alternator voltage input terminal SE on the regulator is then carried out to the terminal B+ of the battery via the transistor T1, the cutting-off of the supply to the excitation coil 31 having previously been carried out by the resetting to zero of the bistable circuit 440 and this position being reached at the point referenced 1008 in FIG. 3.

A high voltage electrical power supply device for the auxiliary circuit of a motor vehicle has thus been described, this device having a particularly good performance insofar as it ensure a high voltage supply under optimum conditions.

We claim:

1. A device for supplying a voltage higher than a nominal supply voltage to an auxiliary electrical circuit of a motor vehicle, said device comprising:
   an alternator having two identical stator windings, a plurality of alternator output terminals and an inductor winding for producing an alternator output voltage;
   rectifier bridge circuit means coupled to said stator windings for rectifying an alternator output voltage developed across said stator windings to supply a rectified alternator voltage on a corresponding alternator output terminal;
   means for regulating an excitation current supplied to said inductor winding of said alternator;
   means coupled to said alternator output terminals for switching said alternator output terminals between a parallel-series and series-parallel connection arrangement to generate a nominal value supply voltage when said connection of said alternator output terminals are switched in parallel and to generate a voltage higher than the nominal value supply voltage when said connection of said alternator output terminals are switched in series;
   control circuit logic means electrically coupled to an input of said excitation regulating means and said switching means for causing said device to produce a voltage higher than the nominal value supply voltage by starting said switching means in said series connection arrangement, said switching means further including an output terminal for carrying the nominal value supply voltage when said switching means is in said parallel connection arrangement and for carrying the higher than nominal value supply voltage when said switching means is in said series connection arrangement;
   said auxiliary electrical circuit further comprising a fast-heating resistive element of the type generally used to de-ice a windshield of an automobile;
   said control circuit logic means having at least one input for receiving a voltage signal corresponding to and representative of the operational conditions of the automobile or environmental conditions for producing on an associated output terminal an output signal to switch said switching means to one of said series-parallel and parallel-series connection arrangement in response to a voltage signal being present at said control circuit input;
   said switching means further comprising a power switching relay having an energizing coil and two operative states, said first operative state corresponding to said energizing coil not being excited and said switching means providing said parallel connection arrangement and said second operative state corresponding to said energizing coil being excited and said switching means providing said series connection arrangement, said energizing coil having terminals and being electrically coupled between a reference electrical ground voltage potential and said associated output terminal of said control circuit logic means,
   said power switching relay further including:
   first, second and third input terminals;
   first, second and third contact blades each having a fixed end coupled to a respective first, second and third input terminal and each blade having a transfer end, and
   first through sixth switching terminal, said transfer end of said first contact blade being movable between and making contact with said first and second switching terminals, said transfer end of said second contact blade being movable between and making contact with said third and fourth switching terminals, said transfer end of said third contact blade being movable between and making contact with said fifth and sixth switching terminals;

said first, second and third output terminals being coupled to respective of said alternator output terminals, said first input terminal being connected to a first alternator output terminal carrying a negative rectified alternator output voltage potential produced by one of said stator windings, said second input terminal being connected to a second alternator output terminal carrying a positive rectified alternator output voltage potential produced by the other of said stator windings, said third input terminal being connected to a third alternator output potential produced by said one stator winding, a fourth alternator output terminal carrying a negative rectified alternator output voltage potential produced by said other of said stator windings being connected to said reference electrical ground voltage potential;

said first and third switching terminals being connected to one another, said fourth and sixth switching terminals being connected to one another and to a positive terminal B+ of the vehicle, said second switching terminal being connected to said reference electrical ground voltage potential and said fifth switching terminal being connected to an auxiliary circuit power supply terminal which supply terminal is in turn connected to the auxiliary electrical circuit, whereby said switching means provides said parallel connection arrangement for said stator windings to supply the nominal supply voltage to the positive terminal B+ of the vehicle when said power switching relay is in its first operative state and provides said series connection arrangement for said stator windings to supply a voltage higher than the nominal voltage to the auxiliary circuit coupled to the fifth switching terminal when said power switching relay is in its second operative state.

2. A device for supplying voltage as defined in claim 1 wherein said control logic means further comprises:
input circuit means for initiating the supply of a voltage higher than the nominal supply voltage;
input control circuit means for controlling the rectified alternator voltage supplied to said excitation regulator;
timing circuit means for operating the device to provide the higher than nominal voltage for a predetermined duration, and
output control circuit means coupled to said switching means for causing said switching means to change between said series connection arrangement and said parallel connection arrangement.

3. A device for supplying voltage as defined in claim 2 wherein said input circuit means for initiating the higher voltage supply comprises:
a first bistable flip-flop circuit triggered by a starting push-button, and
a reset-to-zero circuit to reset said logic control circuit means to zero.

4. A device for supplying voltage as defined in claim 3 wherein said input control circuit means for controlling voltage to said excitation regulator further comprises:
first transistor switching means for disconnecting the rectified alternator voltage supplied to said excitation regulator in response to operation of said starting push-button, said first transistor switching means including a transistor having its emitter terminal connected to the positive terminal B+ and its collector terminal connected to said input of said excitation regulator, said rectified alternator voltage being disconnected by making said transistor non-conductive;
second transistor switching means for connecting the higher voltage supply carried by the auxiliary circuit power supply terminal to said excitation regulator in response to said operation of said starting push-button, said second transistor switching means including a transistor having its emitter terminal connected to said auxiliary circuit power supply terminal and its collector terminal connected in series through at least one resistor to said input of said excitation regulator whereby the magnitude of the rectified alternator voltage supplied to the excitation regulator input from the auxiliary circuit power supply terminal is reduced to a magnitude substantially equal to the magnitude of the rectified alternator voltage supplied in normal operation.

5. A device for supplying voltage as defined in claim 4 wherein said timing circuit means further comprises;
first timing circuit means coupled to said output control circuit means for providing a first enabling signal for use in exciting said switching means to excite said energizing coil after a first predetermined time interval (1) and for providing a second enabling signal to said second transistor switching means of said input control means to make said transistor conductive after a second predetermined time interval (2) to cause said transistor to couple said auxiliary circuit power supply terminal to said excitation regulator, and
second timing circuit means coupled to said first timing circuit means for resetting said first timing circuit means to zero after a third predetermined time interval (3), said higher voltage from said auxiliary circuit power supply being provided during said third predetermined time interval (3).

6. A device for supplying a voltage as defined in claim 5 wherein said output control circuit means further comprises:
a second bistable flip-flop coupled to said first timing circuit means to receive said first enabling signal generated by said first timing circuit means and to provide an output driving signal in response to receiving said first enabling signal;
power transistor means coupled to said second bistable flip-flop and to said auxiliary circuit power supply terminal for exciting said energizing coil in response to said output driving signal being generated by said second bistable flip-flop.

7. A device for supplying a voltage as defined in claim 6 wherein said input control circuit means for controlling voltage to said excitation regulator further comprises:
a flip-flop coupled to said first timing circuit means and providing a control output signal in response to receiving said first enabling signal, said control output signal being coupled to said second transistor switching means for controlling the state of conduction of said transistor of said second transistor switching means.

8. A device for supplying voltage as defined in claim 2 wherein said control circuit logic means further comprises:
circuit means for detecting temperature and for detecting a minimum operating voltage, said circuit means further comprising: a first comparator circuit having a positive and negative input, said positive input being coupled to a first reference voltage potential $Vr_1$ and said negative input being coupled to a reference voltage potential representative of the minimum operating voltage, and a second comparator having a positive and negative input, said positive input being coupled to a second reference voltage potential $Vr_1$ and said negative input being coupled to a resistive bridge including a resistor having a temperature coefficient wherein the voltage developed across the bridge is representative of the ambient temperature.

* * * * *

UNITED STATES PATENT AND TRADEMARK OFFICE
CERTIFICATE OF CORRECTION

PATENT NO. : 4,967,137

DATED : October 30, 1990

INVENTOR(S) : Didier Canitrot, Christian Ducrot, Jean-Francois Terasse

It is certified that error appears in the above-identified patent and that said Letters Patent is hereby corrected as shown below:

COLUMN 11

Line 1, please delete "output" and substitute--input--.

Line 13, before "potential" please insert--terminal carrying a positive rectified alternator output voltage--.

COLUMN 12

Line 27, please delete "(1)" and substitute--($\tau$1)--.

Line 31, please delete "(2)" and substitute--($\tau$2)--.

Line 37, please delete "(3)" and substitute--($\tau$3)--.

Line 39, please delete "(3)" and substitute--($\tau$3)--.

Signed and Sealed this

Third Day of March, 1992

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,967,137

DATED : October 30, 1990

INVENTOR(S) : Didier Canitrot, Christian Ducrot, Jean-Francois Terasse

It is certified that error appears in the above-identified patent and that said Letters Patent is hereby corrected as shown below:

On the title page:

Assignee appears as:   Equiepments Electroques Moteur, Creteil, France

Please delete "Equiepments Electroques Moteur" and substitute--Equipements Electriques Moteur--.

Signed and Sealed this

Seventh Day of July, 1992

Attest:

DOUGLAS B. COMER

*Attesting Officer*   Acting Commissioner of Patents and Trademarks